UNITED STATES PATENT OFFICE.

JOHN F. MENDONSA, OF SPRINGFIELD, ILLINOIS.

IMPROVEMENT IN LUBRICATING COMPOUNDS.

Specification forming part of Letters Patent No. 170,581, dated November 30, 1875; application filed October 11, 1875.

*To all whom it may concern:*

Be it known that I, JOHN F. MENDONSA, of Springfield, in the State of Illinois, have invented an Improved Lubricating Compound; and I do hereby declare the following to be a full and correct description of the same.

To make a barrel of my improved "lubricating-dope" I take the following ingredients, in the quantities named, e. g.: Pure soft water, sixty-eight gallons; lye, four pounds; borax, five pounds; tallow, fifty pounds; fire-clay, ten pounds; sulphur, five pounds; black lead, ten pounds; rock-salt, twenty pounds. These ingredients I mix together, and boil down to forty-five gallons, when the compound is ready for use.

This "dope" is especially adapted to use on railroad-car axles, as it requires no packing with "waste," and is powerfully refrigerant in its action upon hot boxes. I have given it extensive practical trials on railroad-car axles, and uniformly with satisfactory results.

What I claim is—

The lubricant, prepared in the manner and consisting of pure soft water, lye, borax, tallow, fire-clay, sulphur, black lead, and rock-salt, substantially in the proportions named.

The above specification of my said invention signed and witnessed at Springfield this 13th day of September, A. D. 1875.

JOHN F. MENDONSA.

Witnesses:
JOHN SEEDERS,
JOHN FERNANDES.